United States Patent [19]
Montesissa et al.

[11] 3,856,725
[45] Dec. 24, 1974

[54] WATER-SOLUBLE RESINS AND METHODS FOR THEIR PREPARATION

[75] Inventors: Giorgio Montesissa; Francesco Piepoli, both of Piacenza, Italy

[73] Assignee: Montecatini Edison S.p.A., Milan, Italy

[22] Filed: Nov. 24, 1972

[21] Appl. No.: 309,060

[30] Foreign Application Priority Data
Nov. 29, 1971  Italy................................. 31773/71
Feb. 8, 1972  Italy................................. 20333/72

[52] U.S. Cl. 260/18 EP, 117/132 BE, 117/132 BF, 117/161 ZB, 204/181, 260/19 EP, 260/19 UA, 260/21, 260/29.2 EP, 260/32.4, 260/32.6 R

[51] Int. Cl. ........................................... C08g 45/06

[58] Field of Search ....... 260/18 CL, 19 UA, 19 EP, 260/20, 826, 32.6, 33.6, 29.2 EP, 18 EP

[56] References Cited
UNITED STATES PATENTS

| | | | |
|---|---|---|---|
| 2,844,553 | 7/1958 | Taylor............................ | 260/19 EP |
| 3,030,332 | 4/1962 | Lombardi....................... | 260/19 EP |
| 3,245,925 | 4/1966 | Watson.......................... | 260/19 EP |
| 3,293,201 | 12/1966 | Shahade ........................ | 260/18 CL |
| 3,468,704 | 9/1969 | Graver ........................... | 260/22 EP |
| 3,563,929 | 2/1971 | Guldenpfennig................ | 260/22 EP |
| 3,598,775 | 8/1971 | Huggard......................... | 260/18 EP |
| 3,663,487 | 5/1972 | Bruecker........................ | 260/23 EP |
| 3,697,461 | 10/1972 | Troeger et al. ................ | 260/19 UA |
| 3,707,516 | 12/1972 | Walus............................. | 260/21 |
| 3,733,287 | 9/1973 | Masuda et al.................. | 260/18 EP |
| 3,758,427 | 9/1973 | Katsibas......................... | 260/18 EP |

FOREIGN PATENTS OR APPLICATIONS
40-3702  2/1965  Japan............................. 260/18 CL

*Primary Examiner*—Ronald W. Griffin
*Attorney, Agent, or Firm*—Hubbell, Cohen & Stiefel

[57] ABSTRACT

Acidic resins which, after being neutralized, are used in water-soluble paints and comprising the reaction product of (I) a compound having at least one oxirane ring and a mean molecular weight of 100 to 20,000, (II) at least one polyunsaturated monocarboxylic acid having 8 – 20 carbon atoms and (III) an α,β-unsaturated monocarboxylic acid of the formula:

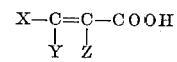

wherein X, Y and Z are independently selected from the group consisting of hydrogen, alkyl and aryl. This reaction product may also optionally include a phenolic compound (IV), in which case an α,β-unsaturated dicarboxylic acid (or anhydride) (V) of the formula:

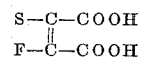

wherein S and T are independently selected from the group consisting of hydrogen, alkyl and aryl, may be substituted for component (III).

18 Claims, No Drawings

WATER-SOLUBLE RESINS AND METHODS FOR THEIR PREPARATION

SUMMARY OF THE INVENTION

The present invention provides a new class of acidic resins which, when neutralized, are water-soluble and are used in preparing water-soluble paints.

The resins comprise the reaction product of (I) an organic compound having a mean molecular weight between 100 and 20,000 and containing at least one oxirane ring, (II) at least one polyunsaturated monocarboxylic acid having 8 to 20 carbon atoms and (III) an $\alpha\beta$-unsaturated monocarboxylic acid of the formula:

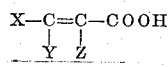

wherein X, Y and Z are independently selected from the group consisting of hydrogen, alkyl of from 1 to 6 carbon atoms and phenyl groups. The resins may further comprise (IV) a phenolic compound such as phenol or a phenol substituted in the para-position with a member selected from the group consisting of alkyl of from 1 to 6 carbon atoms, phenyl, —$CH_2R$, —OR, —COR, and —COOR; R being an alkyl of from 1 to 6 carbon atoms or phenyl group. When the resin includes the phenolic compound (IV), there may be substituted for component (III), either partially or completely, a component (V) which is an $\alpha\beta$-unsaturated dicarboxylic acid (or anydride) having the formula:

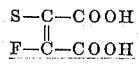

wherein S and T are independently selected from the group consisting of hydrogen, alkyl of from 1 to 6 carbon atoms and phenyl groups.

The resins are prepared by a two stage reaction wherein an adduct is first formed from components (II) and (III) and the thus formed adduct is then reacted with component (I). Alternatively, an epoxy ester may be formed from components (I) and (II) and thereafter the epoxy ester is reacted with component (III).

DETAILED DESCRIPTION

The present invention has for an object the preparation of water-soluble resins particularly suited for use in the paint industry, for the production of water-souble paints.

More particularly, the invention concerns the preparation of acidic resins which are the reaction products of (I) an organic compound containing at least one oxirane ring and having a mean molecular weight of from 100 to 20,000, (II) at least one polyunsaturated monocarboxylic fatty acid having from 8 to 20 carbon atoms and more than one olefinic double bond, and (III) an $\beta$-unsaturated monocarboxylic acid of the formula:

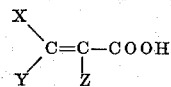

wherein: X, Y and Z are independently selected from the group consisting of hydrogen, alkyl and phenyl groups. The resins may also include (IV) a phenolic compound, in which case, component (III) is completely or partially substituted by (V) an $\alpha,\beta$- unsaturated dicarboxylic acid (or its anhydride) of the formula:

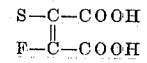

wherein S and T are independently selected from the group consisting of hydrogen, alkyl or phenyl groups.

The organic compound (I) consists, preferably, but not necessarily of an epoxy resin of either the bisphenol or aliphatic type.

As component (II) there may be used a single acid, or a mixture of polyunsaturated monocarboxylic fatty acids having 8–20 carbon atoms; if only a single acid is used, it must have at least two olefinic double bonds, and it is preferable that it contains at least one pair of conjugated double bonds. Of course, in the polyunsaturated acids used, there may be present conjugated double bonds besides isolated double bonds.

For reasons of convenience, in practice, it is preferred to use as component (II), a mixture of monocarboxylic fatty acids which, in addition to the polyunsaturated acids having at least two double bonds, may also contain monounsaturated and/or saturated acids. Moreover, it must be kept in mind that there is a possibility that possible pairs of isolated double bonds, present in the chains of the fatty acids of component (II), will isomerize under operational conditions, due to thermal or catalytic effects, giving rise to pairs of conjugated double bonds.

Examples of component (II) are: the dehydrated castor oil fatty acids, linseed fatty acids, and the so-called "isomerginic acids", that is, polyunsaturated fatty acids having at least one pair of conjugated double bonds and being obtained from fatty acids having isolated double bonds by isomerization (shifting of double bonds) catalyzed by alkalis. Thus, for instance, from linoleic acid one obtains a mixture of two fatty acids having conjugated double bonds:

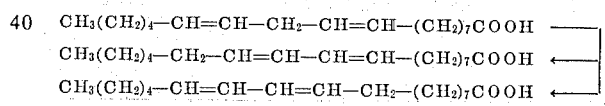

and from linolenic acid one obtains a mixture of three fatty acids having systems of conjugated double bonds:

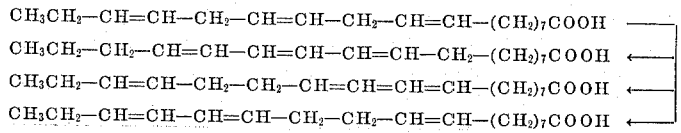

Similarly, it is possible to isomerize polyenic fatty acids of higher molecular weight.

As component (III) it is preferred to use acrylic or methacrylic acid or a mixture thereof.

As the phenolic compound (IV) there may be used, phenol or phenol substituted in the para-position with a substituent selected from the group consisting of alkyl of from 1 to 6 carbon atoms, phenyl, —$CH_2R$, —OR, —COR and —COOR, wherein R is an alkyl of from 1 to 6 carbon atoms, or phenyl group.

As component (V) it is preferred to use fumaric or maleic acid or maleic acid anhydride.

The reins obtained according to the invention contain a sufficient number of free carboxylic groups to allow them to be dissolved, emulsfied or diluted in water, after such carboxyl groups have been neutralized by means of a base. Paints based on the resin which do not contain phenol type compounds are especially suited for being applied by means of electrodeposition, while those containing phenol compounds are especially suited for being applied by the dipping method.

The preparation of the resins not containing phenol compounds may be carried out in several ways. According to one of these methods, in a first step, an adduct between the polyunsaturated monocarboxylic fatty acid (II) and the αβ-unsaturated monocarboxylic acid (III) is prepared.

The adduct may be prepared, for instance, by feeding the αβ-unsaturated acid (III) into a reactor containing fatty acid (II), maintained at a temperature between 100°C and 300°C.

The feeding of the αβ-unsaturated acid (III) is regulated during the course of the reaction so as to avoid an excess of free αβ-unsaturated acid (III). The course of the reaction may be followed through analytical controls and by suitably keeping the reflux under control. The reaction may be conducted in an atmosphere of inert gas, in a pressurized reactor or in a reactor filled with a reflux cooler in the presence or absence of an inert solvent.

At the end of the reaction, that is, when the acid number of the adduct has reached the desired value necessary for making the final resin soluble, dilutable or emulsifiable in water, the reaction is interrupted by discontinuing the feeding of the αβ-unsaturated acid.

The excess of free αβ-unsaturated acid in the reaction mixture may be removed by distillation at atmospheric pressure or under vacuum, or in a current of an inert gas.

The reactions which occur during the preparation of the adduct are of different kinds. Amongst them, the most probable is a Diels-Alder type reaction. In fact, the αβ-unsaturated acid may add to the conjugated double bonds present in the fatty acid (II) with the formation of structures of the following type:

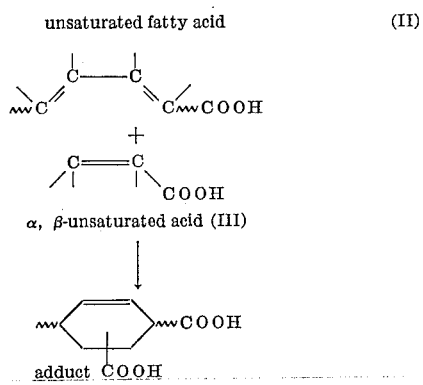

However, other reactions may also take place.

Besides the Diels-Alder reactions there may occcur, for instance, reactions of the type:

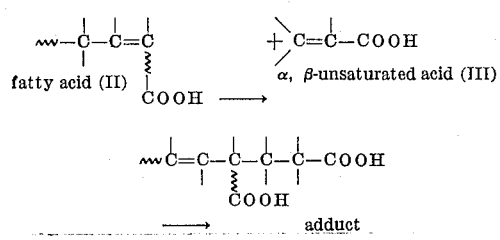

In fact, it has unexpectedly been found that in certain cases, the addition of the αβ-unsaturated monocarboxylic acid proceeds beyond the expected extent based on the number of conjugated double bonds already present n the fatty acid. In other words, the quantity of addable αβ-unsaturated acid may be greater than that which one would expect from a conventional Diels-Alder reaction.

It follows that if the fatty acid (II) does not contain in its chain any conjugated double bonds, the reaction will be possible all the same. In fact, if the fatty acid (II) contains no conjugated double bonds, it is possible that they will be formed from isolated double bonds by catalytic or thermal isomerization, or that the reaction between components (II) and (III) takes place according to a mechanism of the type herein above described, different from that of the Diels-Alder addition.

The foregoing examples of reaction mechanisms are merely given to show that it is possible for addition to occur between the α, β-unsaturated acid (III) and the fatty acid (II). However, we are not to be considered as being bound to any one theory as to how the reactions proceeed and thus, the invention is not to be considered as being limited to any of these theories.

It is possible to avoid or at any rate substantially reduce the homopolymerization of the α, β-unsaturated acid by carrying out the preparation of the adduct between the fatty acid (II) and the α, β-unsaturated acid (III) in the presence of known polymerization inhibitors such as quinones, hydroquinones, etc.

The kind of addition reactions that take place between the two acids (II) and (III) cannot be precisely predicted.

It is, however, clear that the possiblity of adding an α, β-unsaturated acid to a polyunsaturated fatty acid is very promising from a practical point of view.

This reaction allows one to synthesize complex molecules containing free carboxyl groups and which are endowed with considerable solubilizing capacities with respect to water, after a preliminary neutralization.

For the preparation of the water-soluble resins not containing phenol compounds (IV), the adduct obtained from the fatty acid (II) and from the α, β-unsaturated acid (III) is made to react in a second step with an organic compound (I) containing at least one oxirane ring per molecule, preferably an epoxy resin.

In this case, an addition reaction occurs between a carboxyl group of the adduct and the oxirane ring:

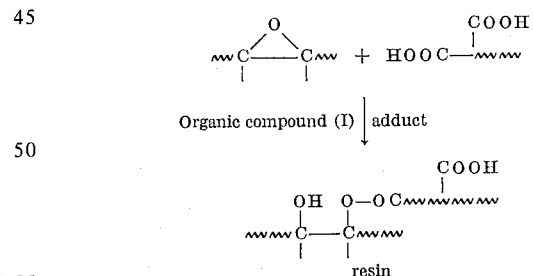

Of course, the ratios between the organic compound (I) and the adduct will be selected so as to ensure the presence, in the final resin, of a number of free carboxyl groups sufficient to ensure, after a preliminary neutralization, the solubility, dilutability or emulsifiability of the resins in water.

The reaction for preparing the resin may be carried out without difficulty by placing the organic compound (I) and the adduct, in suitable ratios, into a reactor heated at between 50°C and 200°C, in the presence of an inert gas at a pressure of from 1 to 2 atmospheres.

The reaction may also be conducted in the presence of suitable catalysts consisting of inorganic or organic bases, such as: KOH, triethylamine, dimethylethanolamine, benzyldimethylamine, etc.

The course of the reaction is followed by controlling the values of the free acid number and the viscosity.

Once the resin has achieved the desired acity and viscosity characteristics, the reaction is interrupted by cooling. This cooling may be achieved by known methods, for instance, by discharging the hot resin from the reactor through a suitable heat exchanger, or by introducing an inert solvent directly into the reactor.

The above illustrated method is not the only method for obtaining the non-phenolic resins.

Another method, for instance, comprises preparing, in a first step, a reaction product between the organic compound (I) containing the oxirane ring and the polyunsaturated fatty acid (II), and in reacting, in a second step, the thus obtained product with the $\alpha$, $\beta$-unsaturated acid (III).

The reaction procedures for this method are not substantially different from those described above.

The first step is the preparation of an "epoxy ester," that is, an ester obtained from an epoxy compound according to known procedures.

The second step of adding the $\alpha$, $\beta$-unsaturated acid to the epoxy ester may be carried out by introducing the acid either gradually or all at once at the beginning of the reaction in the presence or absence of an inert solvent.

The temperature may be anywhere within a wide range, depending on the type of compounds made to react and, in general, is between 100°C and 300°C.

This procedure leads substantially to the same type of resin, and the reactions may be schematically represented in the following way:

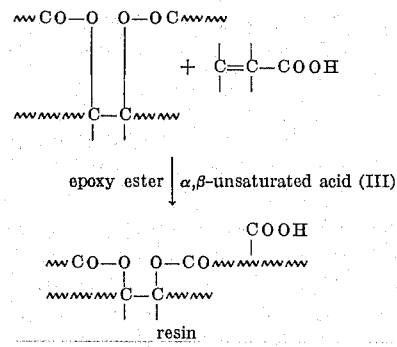

The ratios between the components and, thus, the number of carboxyl groups to be introduced, will be suitably chosen depending on the degree of solubility one wishes to impart to the resin, and thus, they are not per se critical.

In general, the molar ratio between components (I), (II) and (III) is between 1:1:0.5 and 1:4:8.

The most convenient way to obtain the desired end resin will be selected according to the characteristics of the starting products, for instance fatty acids (II) of a high or low degree of unsaturation, or epoxy resins of high or low molecular weight, with one or two oxirane rings per molecule, etc., in order to avoid as much as possible any harmful secondary reaction, or in order to enchance particular characteristics in the final resin, for instance, the solubility in water, etc.

The resin prepared according to one of the methods described above is finally neutralized with an inorganic or organic base such as NaOH, KOH, $NH_4OH$, mono-, di- or triethanolamine, triethylamine, mono- or dipropanolamine, etc., preferably after having dissolved the resin itself in a suitable solvent such as monoethyl ether of ethyleneglycol or of diethyleneglycol, various alcohols (methyl, ethyl, n-butyl, isobutyl alcohol, etc.), acetone, methyl-ethylketone, butylcellosolve, ethylacetate and the like.

The possibility of preparing a resin which is soluble, dilutable or emulsifiable in water, according to the process of this invention, is advantageous from a practical point of view. In fact, known processes for the introduction of carboxyl groups into organic compounds intended for the preparation of resins for water-soluble paints, involve the reaction of compounds with one or more double bonds with maleic acid anhydride.

This process has, however, considerable disadvantages. In fact, the reaction of maleic acid anhydride with an unsaturated fatty acid leads to adducts containing a minimum of three carboxyl groups per molecule of reacted fatty acid:

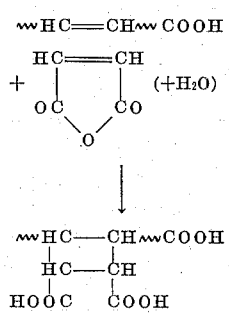

This high acid functionality causes the formation of three-dimensional structures which are easily gelled during the subsequent esterification step with an organic compound containing oxirane rings or free hydroxyl groups.

According to the present invention, on the contrary, the adduct has a much lower acid functionality (it actually is bi-functional) and thus, has a greater tendency to lead to linear structures that are difficult to gel.

Similar advantages can be had when the reaction of the $\alpha$, $\beta$-unsaturated acid is directly conducted on the epoxy ester product obtained by reacting a polyunsaturated fatty acid with the organic compound containing the oxirane ring.

In fact, when reacting maleic acid anhydride according to the prior art techniques, with a product of this type, the reaction will develop in two directions; the first involving addition to the double bonds of the fatty acid, and the second involving esterification of the free hydroxyl groups of the epoxy ester molecule, for example, those contained in the epoxy resin used as component (I).

Obviously, the second reaction leads to ester type bonds that are not very stable in basic media. Thus, when one proceeds to the neutralization with bases in order to solubilize the resin, there readily occurs a hydrolysis of this ester type bond. since the ester type bond is connected to the solubilizing carboxyl group, it follows that as a result of the hydrolysis, the resin gradually loses its water-solubility. All these problems do not arise when an $\alpha$, $\beta$-unsaturated monocarboxylic acid is used instead of maleic acid anhydride, since the reactivity of this acid, as far as the esterification is concerned, is much less than that of maleic acid anhydride.

The paints prepared from the non-phenolic resins are particularly suited for being applied by means of electrodeposition.

In tests on these paints, it was ascertained that they had exceptional powers of penetration which make it possible to coat even the inside of hollow articles, in positions which are very difficult to reach with conventional electrodeposition paints.

These phenol-free resins may be self-crosslinking. In cases where they have no self-crosslinking properties, it is necessary to add up to 50% of suitable crosslinking resins (especially phenol resins, but also urea or melamine resins) if it is desired to make oven-curing paints. If it is desired to make air-drying paints, it is sufficient to add to the phenol-free resins up to 20% of the usual driers (e.g.: lead, cobalt, zirconium or zinc compounds such as cobalt naphthenate).

The preparation of resins containing the phenolic compound may be carried out in several ways.

According to one of the preparative methods, an adduct between the polyunsaturated monocarboxylic fatty acid (II) and the α, β-unsaturated monocarboxylic acid (III) and/or the α, β-unsaturated dicarboxylic acid or its anhydride (V) is prepared in a first stage.

when using the α, β-unsaturated monocarboxylic acid (III), the adduct may be prepared, for example, by gradually feeding the α, 60 β-unsaturated acid into a reactor containing fatty acid (II) and maintained at temperatures between 100°C and 300°C. The course of the reaction is monitored by analyzing the reaction product and by suitably regulating the reflux rate.

The reaction may be conducted in an inert gas atmosphere, in a pressurized reactor, or it may be conducted in a reactor fitted with a reflux-cooler, in the presence or absence of an inert solvent.

At the end of the reaction, that is when the acid number and the viscosity of the adduct have reached the desired values, the interrupted is interruptd by discontinuing the feeding of the α, β-unsaturated acid. The excess unreacted α, β-unsaturated acid in the reaction mixture may be removed by distillation at atmospheric pressure, or under vacuum, or in a current of an inert gas.

The reactions that occur between the α, β-unsaturated acid and the polyunsaturated fatty acid may be of different kinds; the most probable reaction is a Diels-Alder type reaction. In this case, homopolymerization of the α, β-unsaturated acid may be avoided or at least reduced by preparing the adduct in the presence of known homopolymerization inhibitors such as quinones, hydroquinones, etc.

When using the α, β-unsaturated dicarboxylic acid or its anhydride (V), the adduct may be prepared, for example, by introducing into the reactor, the polyunsaturated monocarboxylic acid (II) and component (V), and by reacting them at temperatures between 150°C and 300°C.

The reaction is conducted in the presence of an inert gas, in the presence of an inert solvent such as toluene or xylene.

The ratio between the reaction components are selected according to the nature of the components and depending on the acidity characteristics of the adduct that one wishes to prepare.

In this case, as with the non-phenolic resins, the reactions that take place may vary in nature, though still generally being addition reactions between double bonds.

The second stage of the process for the preparation of phenol-containing resins comprises reacting oxirane containing compound (I) with the phenolic comound (IV). This reaction may be carried out, for example, by introducing into the reactor the organic compound (I) and the phenolic compound (IV) in the presence or absence of inert solvents (e.g.: toluene, xylene) and suitable catalysts such as: KOH, NaOH, LiOH, $Na_2CO_3$, benzyldimethylamine, triethylamine, dimethylethanolamine or benzylrimethylammonium hydroxide. The reaction temperature is between 60°C and 200°C, and the reaction may be conducted in an atmosphere of an inert gas, in a pressurized reactor or in a reactor fitted with a reflux cooler. The course of the reaction is followed through analytical examinations, the most significant of which are the determination of the epoxy equivalent and, in certain cases, of the percentage of dry residue.

Usually the reaction is interrupted when the determination of the epoxy equivalent indicates very high values and in certain cases practically infinite values.

The reactions that take place between the oxirane compound (I) and the phenolic compound (IV) consist mainly in the opening up of the oxirane ring and the consequent formation of ether bonds:

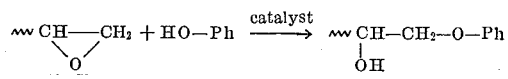

wherein Ph is phenyl or a para-substituted phenyl.

The final step of the process that leads to the phenol-containing resins is carried out by reacting in suitable ratios the "epoxy ether" (an ether derived from an epoxy compound), obtained by the reaction between organic compound (I) and the phenolic compound (IV), with the adduct obtained by the reaction between the polyunsaturated monocarboxylic fatty acid (II) and the α, β-unsaturated acid (III) and/or the α, β-unsaturated dicarboxylic acid or its anhydride (V).

The esterification between the adduct and the epoxy ether is carried out in a reactor heated at a temperature between 150°C and 250°C in the presence of an inert gas at atmospheric pressure and preferably under recycling conditions with the use of an inert solvent capable of forming an azeotrope with the reaction water, e.g., xylene.

The course of the reaction is followed by checking the acid number and viscosity of the product.

Once the resin has attained the desired acidity and viscosity characteristics, the reaction is interrupted by cooling the reactor. This cooling may be achieved by conventional means or by introducing, directly into the reactor, a diluent for the resin.

Another method for preparing the phenol-containing resins of the invention is as follows:

In a first step, one prepares the epoxy ether between the oxirane compound (I) and the phenolic compound (IV) following the procedures described above. The intermediate thus obtained is reacted in a second step with the polyunsaturated monocarboxylic fatty acid (II), at temperatures ranging from 150°C to 260°C. The reaction that takes place is an esterification that is conducted following the conventional esterification procedures. Subsequently, the thus obtained resin is carboxylated by means of the α, β-unsaturated acid (III) and/or the α, β-unsaturated dicarboxylic acid or its anhydride (V).

The introduction of the carboxyl groups is carried out by addition of the α, β-unsaturated compounds to the double bonds of the polyunsaturated fatty acid, at temperatures ranging from 100°C to 250°C. This reaction step is conducted in a stream of an inert gas. The quantity of α, β-unsaturated compound, that is, the number of solubilizing carboxyl groups to be introduced, will be suitably selected depending upon the degree of solubility in water that one wishes to impart to the resin.

The major reactions occurring according to this second method can be schematically indicated as follows:

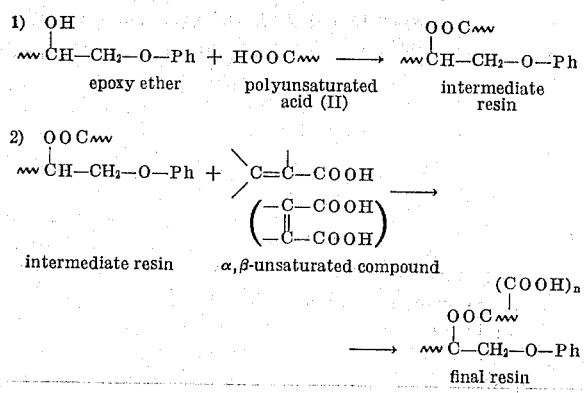

wherein $n$ is the minimum number of carboxyl groups necessary to render the resin water-soluble.

The molar ratios generally employed among components (I), (IV), (II), (III) and/or (V) are between 1:1:1:0.5 and 1:2.5:12:8.

The phenol-containing resin prepared according to the above decribed processes is finally neutralized, preferably after dissolution of the resin itself in a solvent, as in the case of the phenol-free resins.

The phenol-containing resins in certain cases may have self-crosslinking properties; in general, however, the addition of up to 50% of suitable crosslinking resins (especially phenol resins, but also urea or melamine resins) is required if baking paints are desired. If, conversely, air-drying paints are to be prepared, the addition of up to 20% of the conventional driers (compounds of lead, cobalt, zirconium or zinc, such as cobalt naphthenate) is sufficient.

The resins obtained according to this invention are employed in the production of paints dilutable in water and to be used for the coating of surfaces for decorative and protective purposes.

The paints obtained from these resins are characterized by exceptional resistance to corrosive agents such as saline, alkaline, or acidic solutions, etc., and are particularly suited for the protection of iron against corrosion.

DESCRIPTION OF THE PREFERRED EMBODIMENTS

The following are illustrative examples directed to the preparation of the resins of the invention and the use thereof in the preparation of paints. These examples are not to be construed as limiting the invention which is defined by the appended claims.

EXAMPLE 1

In this example, the fatty acids used were dehydratedd castor oil fatty acids, a product of Victor wolf Ltd. The $\alpha, \beta$-unsaturated acid was acrylic acid.

The homopolymerization inhibitor was hydroquinone.

The weight ratios between the reactants used were as follows:

| | |
|---|---|
| fatty acids | 400 |
| acrylic acid | 80 |
| hydroquinone | 0.5 |
| inert solvent (xylene) | 1.5 | the $\alpha, \beta$-unsaturated acid was added gradually to the fatty acid at a temperature ranging from 255°C to 260°C, under reflux conditions, while the reaction therebetween proceeded.

The course of the reaction was followed by controlling the acid number (mg. of KOH per g.) and the viscosity (Gardner-Holdt) of the reaction product at regular time intervals. When the product had attained an acid number between 255 and 265 and a viscosity between Y and $Z_2$, the reaction was interrupted and the free, unreacted $\alpha, \beta$-unsaturated acid was removed by using a stream of inert gas such as nitrogen together with vacuum.

The adduct prepared as described can be used for the preparation of water-soluble resins.

EXAMPLE 2

In this example, as the fatty acids, there was used "isomerginic acids of the SY type" a product of Hamburger Fettchemie Brenckman & Mergell GmbH. The $\alpha, \beta$-unsaturated acid was acrylic acid.

The homopolymerization inhibitor was hydroquinone.

The weight ratios between the reactants were as follows:

| | |
|---|---|
| fatty acids | 400 |
| acrylic acid | 85 |
| hydroquinone | 0.5 |
| inert solvent (xylene) | 2.0 |

The $\alpha, \beta$-unsaturated acid was added to the fatty acid at between 250°C and 255°C, under reflux conditions. The operating and control procedures during the reaction were the same as described in Example 1.

The final product or adduct thus prepared had an acid number varying from 260 to 270, and a Gardner-Holdt viscosity of from Z to $Z_3$.

The adduct prepared as described above can be used for the preparation of water-soluble resins.

EXAMPLE 3

In this example, there were used as fatty acids, the "isomerginic SK type acids" a product of Hamburger Fettchemie Brinckman & Mergell GmbH. The $\alpha, \beta$-unsaturated acid was acrylic acid.

The homopolymerization inhibitor was hydroquinone.

The weight ratios between the reactants were:

| | |
|---|---|
| fatty acids | 400 |
| acrylic acid | 40 |
| hydroquinone | 0.3 |
| inert solvent (xylene) | 2.0 |

The $\alpha, \beta$-unsaturated acid was added to the fatty acid according to the procedures described in Example 1. The adduct thus prepared had an acid number that varied from 230 to 240, while the Gardner-Holdt viscosity was between P and S. The thus prepared adduct can be used for the preparation of watersoluble resins.

The adduct prepared as in Example 1, was used for the preparation of a water-soluble resin, by adding it to the oxirane rings of an epoxy resin.

The epoxy resin used for this purpose was DER 661 resin, a product of the Dow Chemical Company. The catalyst used was benzyldiethylamine. The adduct of Example 1, the above epoxy resin and the catalyst were charged into a reactor in the following weight ratios:

| | |
|---|---|
| epoxy resin | 525 |
| adduct | 365 |
| catalyst | 0.2 |

The reaction was conducted at a temperature between 130°C and 140°C, in the presence of an inert gas.

The course of the reaction was controlled by measuring, at regular time intervals, the acid number and the viscosity.

When the acid number was between 55 and 60, and the viscosity of a 60 % solution in xylene was between Z and $Z_3$, the reaction was interrupted by cooling the reactor and by introducing a solvent for the resin into the reactor.

The solvent used for this purpose was butylcellosolve. The resin was discharged from the reactor as a 70% dry residue.

EXAMPLE 5

The adduct prepared as described in Example 2 was used for the preparation of a water-soluble resin by adding it to the oxirane rings of an epoxy resin.

The epoxy resin used for this purpose was Epon 1,001, a product of Shell Chemical Company. The catalyst used was benzyltrimethylammonium hydroxide.

The adduct of Example 2, the above epoxy resin and the catalyst were charged into a reactor in the following weight ratios;

| | |
|---|---|
| epoxy resin | 500 |
| adduct | 400 |
| catalyst | 0.2 |

The reaction was conducted at a temperature between 130°C and 140°C, in the presence of an inert gas.

The course of the reaction was monitored as in Example 4. The thus prepared resin had an acid nubmer that varied from 50 to 60 and the viscosity of a 60% solution thereof in xylene between $Z_2$ and $Z_4$.

The solvent for the resin was isobutyl alcohol. The resin was discharged from the reactor as a 60% dry residue.

EXAMPLE 6

The adduct prepared as described in Example 3 was used for preparing a water-soluble resin by adding it to the oxirane rings of an epoxy resin.

The epoxy resin used for the purpose was Araldit GY 250, a product of CIBA.

The catalyst was triethylamine. The reaction was conducted at a temperature between 150°C and 160°C, in the presence of an inert gas. The adduct of Example 3, the above epoxy resin and the catalyst were charged into a reactor in the following weight ratios:

| | |
|---|---|
| epoxy resin | 380 |
| adduct | 700 |
| catalyst | 0.2 |

The course of the reaction was monitored as described in Example 4. The prepared resin had an acid number between 44 and 55, and the viscosity of a 60% solution thereof in xylene between H and M.

The solvent for the resin was n-butyl alcohol. The resin was discharged from the reactor as a 80% dry residue.

EXAMPLE 7

In this Example, there were used as fatty acids, the dehydrated fatty acids of castor oil (Victor Wolf Ltd.) and the fatty acids or linseed oil (Massa). The epoxy resin used was Epon 1011 (Shell). The $\alpha$, $\beta$-unsaturated acid was acrylic acid.

In the first step, an epoxy ester was prepared and subsequently this product was reacted with the acrylic acid.

The ratios between the reactants were as follows:

| | |
|---|---|
| epoxy resin | 500 |
| dehydrated castor oil fatty acids | 600 |
| linseed oil fatty acids | 475 |
| inert solvent (xylene) | 50 |
| acrylic acid | 80 |

The esterification step was conducted at temperatures varying from 230°C to 250°C, under recycling conditions in order to remove the reaction water. Once the epoxy ester had attained an acid number between 20 and 35, and a Gardner-Holdt viscosity (of a 60% solution thereof in butylcellosolve) between E and G, the reactor temperature was brought down to 200°C to 220°C.

At this temperature, the acrylic acid was gradually added, whereby to effect the addition reaction of the acrylic acid to the fatty acids forming part of the epoxy ester.

This second step of the reaction was carried out under reflux conditions. Once the product had attained an acid number varying from 55 to 65, and a viscosity varying from X to Z, the reaction was interrupted by cooling the reactor and removing the unreacted acrylic acid monomer as described in Example 1.

The thus obtained resin was then diluted to 70% in isobutyl alcohol.

EXAMPLE 8

In this Example, the fatty acids used were dehydrated fatty acids of castor oil (Victor Wolf Ltd.).

As the epoxy resin there was used Epikote DX 20, a product of Shell Chemical Company.

The $\alpha$, $\beta$-unsaturated acid used was acrylic acid. The homopolymerization inhibitor was hydroquinone.

As in Example 7, the reaction took place in two steps. In the first step there was prepared the epoxy ester, while in the second step the acrylic acid was added to the fatty acid moiety of the epoxy ester.

The weight ratios between the reactants were as follows:

| | |
|---|---|
| epoxy resin | 450 |
| fatty acids | 700 |
| inert solvent (xylene) | 50 |
| hydroquinone | 0.5 |
| acrylic acid | 80 |

The esterification was conducted as in Example 7. The second stage of the reaction was effected after the epoxy ester was cooled in the reactor to a temperature varying from 100°C to 120°C. The acrylic acid was added to the reactor, and then the temperature of the reactor was brought up to between 200°C and 220°C.

The addition reaction was carried out at this temperature under reflux conditions.

Once the resin had attained an acid number of between 55 – 65 and a viscosity between V and Y, it was cooled down and the unreacted acrylic acid monomer was removed as described in Example 1.

The resin was diluted to 60% in butylcellosolve.

The water-soluble resins prepared as described in Examples 4, 5, 6, 7 and 8 were used for the preparation of water-soluble paints.

EXAMPLE 9

In this Example, the resin prepared as described in Example 4 was neutralized with triethylamine to a pH of between 9.2 and 9.7, and was converted into a water-soluble paint in the following way:

The resin was pigmented by charging it, together with the pigments into a mill, using the following weight ratios:

| | |
|---|---|
| neutralized resin | 150 |
| deionized water | 100 |
| rutile titanium dioxide | 120 |

This charge was ground with steatite balls for 12 hours and the ground material was then made into a paint by adding to it, under stirring, 430 g of neutralized resin, 100 g of melamine resin (hexamethoxymelamine) and deionized water to attain a total dry product of 10%.

Into the paint, there was introduced an electrode connected to the negative pole of a direct current generator. At a suitable distance (minimum 10 cm) there was introduced a phosphatized iron plate connected to the positive pole of the generator. Direct currents at varying voltages between 50 and 300 volts were passed through the paint for two minutes. There were obtained homogeneous and adhering films which, after curing in an oven at 180°C, became insoluble and highly resistant to corrosion and to mechanical stresses.

It is important to note the continuous and gradual increase in the quantity of paint electrodeposited on the anode, depending upon the applied voltage:

| Applied Voltage | | Quantity of Electrodeposited Paint | |
|---|---|---|---|
| 50 | volts | 0.1 | mg/sq.cm |
| 100 | do. | 0.3 | do. |
| 150 | do. | 0.6 | do. |
| 200 | do. | 1.3 | do. |
| 250 | do. | 3.0 | do. |
| 300 | do. | 4.8 | do. |

It was observed that the thus prepared paint was endowed with a very high power of penetration.

The test was carried out by painting a cylindrical shaped object with a closed bottom. This cylinder of common steel sheet, had a diameter of 50 mm and a height of 70 mm.

On the wall of the cylinder, adjacent the bottom, there was a hole of 5 mm diameter. The cylinder was immersed in an electrodeposition bath for 3/4 of its height. A direct current with a voltage varying from 100 to 130 volts was passed through the bath for two minutes. The 5 mm hole was sufficient to allow complete internal and external coating of the cylinder. After curing the cylinder in an oven at 180°C, the thickness of the inner paint film was such as to ensure a very high corrosion resistance.

EXAMPLE 10

The resin prepared in Example 5 was neutralized with diethanolamine to a pH between 8.2 and 8.7, and was then converted into a water-soluble paint in the following way:

The resin was pigmented by charging it, together with pigments, into a mill in the following weight ratios:

| | |
|---|---|
| neutralized resin | 75 |
| rutile titanium dioxide | 190 |
| micronized talc | 30 |
| micronized barytes | 30 |
| carbon black | 2 |
| deionized water | 160 |

The charge was ground with steatite balls for 48 hours and the ground product was made into paint by adding to it 290 g of neutralized resin, 40 g of melamine resin (hexamethoxymelamine) and 183 g of deionized water.

The paint was applied to a metal support by means of conventional procedures (e.g.: by dipping, flow-coating, spraying or by brush). Drying of the coating film was effected by bakingn in an oven at 180°C. The obtained film displayed satisfactory aesthetic characteristics, good resistance to saline mist according to ASTM rule B 117-61 and resistance to mechanical stresses.

EXAMPLE 11

The water-soluble resins prepared as described in Examples 6, 7 and 8 were neutralized with triethylamine to a pH between 9.0 and 9.5, and were then converted into water-soluble paints in the following way:

The resin was pigmented by charging it, together with pigments, into a mill in the following weight ratios:

| | |
|---|---|
| neutralized resin | 75 |
| rutile titanium dioxide | 190 |
| micronized talc | 30 |
| micronized barytes | 30 |
| carbon black | 2 |
| deionized water | 160 |

The charge was ground by means of steatite balls for 48 hours and the ground material was transformed, under stirring, into a paint by adding to it 290 g of neutralized resin, 20 g of cobalt naphthenate and 203 g of deionized water.

The paint was applied to a metal support by means of conventional procedures (e.g.: by dipping, flow-coating, spraying or by brush). There was obtained a continuous and homogeneous film which, after drying in air at temperatures varying from 15°C to 40°C, showed a bright aspect, had good filling properties and was not sticky. It also had high resistance to corrosion and mechanical stresses.

EXAMPLE 12

Preparation of an adduct starting from components (II) and (III).

The fatty acids employed in this Example were the dehydrated fatty acids of castor oil (Victor Wolf Ltd.).

The $\alpha,\beta$-unsaturated acid was acrylic acid.

Hydroquinone was used as an inhibitor of acrylic acid homopolymerization. The weight ratios of the reactants were as follows:

| | |
|---|---|
| fatty acids | 400 |
| acrylic acid | 80 |
| hydroquinone | 0.5 |
| inert solvent (xylene) | 1.5 |

The acrylic acid was gradually added to the polyunsaturated fatty acid during the course of the reaction at a temperature between 255°C and 260°C, under reflux conditions.

The course of the reaction was followed by periodic monitoring of the acid number (mg KOH/g) and viscosity (Gardner-Holdt) of the reaction product.

When the product reached an acid number between 255 and 265 and a viscosity between Y and $Z_2$, the reaction was stopped and the unreacted acrylic acid was removed by means of an inert gas (nitrogen) stream, under vacuum.

An adduct which is an intermediate for the preparation of water-soluble resins according to this invention was thereby obtained.

EXAMPLE 13

Preparation of an "epoxy ether" starting from components (I) and (IV).

The epoxy resin employed was Araldit GY 250 (CIBA).

The organic compound (IV) was phenol.

The catalyst used was 0.5 N alcoholic potassium hydroxide.

The epoxy resin, phenol and catalyst were charged into a reactor in the following weight ratios:

| | |
|---|---|
| epoxy resin | 380 |
| phenol | 200 |
| catalyst | 0.1 |

The reaction was conducted at temperatures ranging from 120°C to 260°C, and the reaction was followed by measuring the epoxy equivalent of the reaction product and the dry residue percentage.

The reaction was completed when the epoxy equivalent had attained practically infinite values.

A light-colored, solid, thermoplastic resin was thus obtained, consisting mainly of the diphenol ether of Araldit GY 250, which is an intermediate for the preparation of the water-soluble resins of the invention.

EXAMPLE 14

Preparation of an "epoxy ether" starting from components (I) and (IV).

The epoxy resin used in this Example is DER 661 (DOW). The organic compoudn (IV) is phenol.

The catalyst used is benzyldimethylamine.

The weight ratios between reactants were as follows:

| | |
|---|---|
| epoxy resin | 1050 |
| phenol | 200 |
| catalyst | 0.5 |

The reaction procedures were the same as those described in Example 13.

EXAMPLE 15

Preparation of a water-soluble resin.

The adduct prepared as described in Example 12 and the diphenol ether (epoxy ether) prepared as described in Example 13 were employed for preparing a water-soluble resin.

The reactants were introduced into a reactor in the following weight ratios:

| | |
|---|---|
| epoxy ether of Example 13 | 600 |
| adduct of Example 12 | 700 |

The mixture was then heated up to 240°C, under stirring, and under an inert gas atmosphere.

The course of the esterification reaction was monitored by periodically measuring the acid number and the viscosity.

As soon as the resin had an acid number between 60 and 65 and a viscosity (of a 60% solution in xylene) between Z and $z_2$, the reaction was stopped by cooling the reactor. The resin was diluted up to 80% of dry residue in butylcellosolve.

EXAMPLE 16

Preparation of a water-soluble resin.

For preparing a water-soluble resin there was used the intermediate (epoxy ether) prepared as described in Example 14.

This intermediate was fed to a reactor along with the linseed oil fatty acids (Victor-Wolf Ltd.) in the following weight ratios:

| | |
|---|---|
| epoxy ether of Example 14 | 560 |
| linseed fatty acids | 750 |
| catalyst | 0.5 |
| inert solvent (xylene) | 50 |

The catalyst used was stannous stearate.

The esterification reaction was conducted at 200°C – 260°C, in an inert gas atmosphere and under recycling conditions.

As soon as the resin had an acid number between 20 and 30, and a viscosity (the product per se) between $Z_4$ and $Z_6$, the reaction mixture was cooled to 150°C. Thereafter, 80 parts by weight of maleic acid anhydride were introduced into the reactor and the reaction was continued for about 1.5 - 2.0 hours at a temperature between 190°C and 200°C, in an inert gas stream.

By operating in this way, the resin attained a final acid number between 50 and 55, and a viscosity (80% solution of the resin in butylcellosolve) between Y and $Z_3$.

EXAMPLE 17

Preparation of a water-dilutable paint.

The water-soluble resin prepared according to Example 15 was employed for producing a water-thinnable paint.

In this Example such a resin, after being neutralized with triethylamine to a pH value between 9.2 and 9.7 was transformed into a paint by charging the resin, along with the pigments, into a steatite ball mill in the following weight ratios:

| | |
|---|---|
| pigment (rutile titanium dioxide) | 500 |
| neutralized resin | 500 |
| deionized water | 500 |

The charge was ground for 12 hours and the ground product was transformed into paint by adding to it, under stirring, 500 parts by weight of neutralized resin, 200 parts by weight of crosslinking melamine resin (hexamethoxymelamine) and deionized water in a quantity sufficient to obtain a total dry product of 10%.

An electrode connected to the negative pole of a direct current generator was dipped into the paint.

A phosphatized iron plate connected to the positive pole of said generator was introduced therein at a suitable distance.

By making a direct current pass through the bath for two minutes at a voltage varying from 50 to 220 volts, homogeneous and adhesive films were obtained which, after curing in an oven at 180°C, became insoluble and highly resistant to corrosion and to mechanical stresses.

EXAMPLE 18

Preparation of a water-dilutable paint.

The resin prepared as described in Example 16 was diluted with butylcellosolve to 80% of dry residue, neutralized with triethylamine to a pH value between 9 and 9.5 and then transformed into a water-thinnable paint in the following way:

The resin was pigmented by feeding it, along with suitable pigments, to a steatite ball mill in the following weight ratios:

| | |
|---|---|
| neutralized resin | 75 |
| pigment (rutile titanium dioxide) | 190 |
| talc | 30 |
| barytes | 30 |
| carbon black | 2 |
| deionized water | 160 |

The charge was ground for 12 hours and the ground product was converted, under stirring, into a paint by admixing it with 300 parts by weight of neutralized resin, 15 parts by weight of crosslinking phenol resin (Methylon 75,108, produced by General Electric Co.) and with 180 parts by weight of dionized water.

This paint was applied to metallic manufactured articles by conventional procedures (dipping, spraying, brushing). A continuous homogeneous film was thus obtained which, after drying in an oven at 160°C – 220°C, appeared glossy, filling, non-sticky and highly resistant to corrosion.

Variations and modifications can, of course, be made without departing from the spirit and scope of the invention.

Having thus described our invention, what we desire to secure by Letters Patent and hereby claim is:

We claim:

1. An acidic resin comprising the reaction product of the following components:
   I. an epoxy resin having a mean molecular weight between 100 and 20,000 and containing at least one oxirane ring per molecule;
   II. at least one polyunsaturated monocarboxylic fatty acid having from 8 to 20 carbon atoms and more then one olefinic double bond; and
   III. an α,β-unsaturated monocarboxylic acid of the formula:

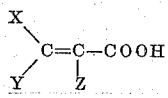

wherein X, Y and Z are independently selected from the group consisting of hydrogen, alkyl of from 1 to 6 carbon atoms and phenyl groups wherein the molar ratio of said components (I), (II) and (III) is between 1:1:0.5 and 1:4:8.

2. A resin according to claim 1, wherein component (I) is an epoxy resin selected from the group consisting of bisphenol epoxy resins and aliphatic epoxy resins.

3. A resin according to claim 1, wherein component (II) is a mixture of polyunsaturated monocarboxylic fatty acids consisting of at least one member of the group consisting of dehydrated castor oil fatty acids, linseed oil fatty acids and isomerginic acids.

4. A resin according to claim 1, wherein component (III) is acrylic acid, methacrylic acid, or a mixture thereof.

5. A resin according to claim 1, wherein the reaction product further comprises a phenolic compound (IV), said phenolic compound being phenol or a para-substituted phenol wherein the para-substitutent is a $C_1$–$C_6$ alkyl, phenyl, —$CH_2R$ or OR, is which R is a $C_1$–$C_6$ alkyl or phenyl, and the molar ratio of said components (I), (IV), (II) and (III) is between 1:1:1:0.5 and 1:2.5:12:8.

6. A resin according to claim 5, wherein component (III) is partially or completely substituted by a component (V) consisting of an α,β-unsaturated dicarboxylic acid of the formula:

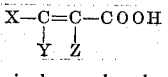

wherein S and T are independently selected from the group consisting of hydrogen, alkyl of from 1 to 6 carbon atoms and phenyl groups; or the anhydride of such acid.

7. A resin according to claim 6, wherein component (V) is fumaric acid, maleic acid or maleic acid anhydride.

8. A process for preparing a resin according to claim 1, comprising reacting components (II) and (III) at a temperature between 100°C and 280°C to form an adduct and thereafter reacting said adduct with component (I) to form the resin.

9. A process for preparing a resin according to claim 1, comprising reacting components (I) and (II) at a temperature between 100°C and 280°C to form an epoxy ester and thereafter reacting said epoxy ester with component (III) to form the resin.

10. A process for preparing a water-soluble, -emulsifiable or -dilutable resin comprising diluting the acidic resin of claim 1 in a solvent selected from the group consisting of butylcellosolve, monoethyl ether of ethyleneglycol, monoethyl either of diethyleneglycol, butyl ether of ethyleneglycol, methyl alcohol, ethyl alcohol, n-butyl alcohol, isobutyl alcohol, acetone, methylethyl-ketone, methyl-isobutyl-ketone, methyl acetate, ethyl acetate, butyl acetate; and neutralizing the diluted acidic resin with an organic or inorganic base selected from the group consisting of monoethanolamine, diethanolamine, triethanolamine, triethylamine, mono-propanolamine, dipropanolamine, NaOH, KOH, and $NH_4OH$.

11. A process for preparing a resin according to claim 2, comprising reacting components (II) and (III) at a temperature between 100°C and 300°C to form an adduct and thereafter esterifying said adduct, at a temperature between 150°C and 250°C, with an intermediate obtained by reacting component (I) with component (IV) at a temperature between 60°C and 200°C.

12. A process for preparing a resin according to claim 5, comprising reacting components (I) and (IV) at a temperature between 60°C and 200°C, to form an intermediate, esterifying said intermediate with component (II) at a temperature between 150°C and 260°C, and reacting the product thus obtained with component (III) at a temperature between 100°C and 250°C.

13. A process for preparing a water-soluble, -emulsifiable or -dilutable resin comprising diluting the acidic resin of claim 5 in a solvent selected from the group consisting of butycellosolve, monoethyl ether of ethyleneglycol, monoethyl ether of diethyleneglycol, butyl ether of ethyleneglycol, methyl alcohol, ethyl alcohol, n-butyl alcohol, isobutyl alcohol, acetone, methylethyl-ketone, methyl-isobutyl-ketone, methyl acetate, ethyl acetate, butyl acetate; and neutralizing the diluted acidic resin with an organic and inorganic base selected from the group consisting of monoethanolamine, diethanolamine, triethanolamine, triethylamine, mono-propanolamine, dipropanolamine, NaOH, KOH, and $NH_4OH$.

14. A process for preparing a resin according to claim 6, comprising reacting components (II) and (III) and/or (V) at a temperature between 100°C and 300°C to form an adduct and thereafter esterifying said adduct, at a temperature between 150°C and 250°C with an intermediate obtained by reacting component (I) with component (IV) at a temperature between 60°C and 200°C.

15. A process for preparing a resin according to claim 6, comprising reacting components (I) and (IV) at a temperature between 60°C and 200°C to form an intermediate, esterifying said intermediate with component (II) at a temperature between 150°C and 260°C and reacting the product thus obtained with component (III) and/or (V) at a temperature between 100°C and 250°C.

16. A process for preparing a water-soluble, -emulsifiable or -dilutable resin comprising diluting the acidic resin of claim 6 in a solvent selected from the group consisting of butycellosolve, monoethyl ether of ethyleneglycol, monoethyl either of diethyleneglycol, butyl ether of ethylenglycol, methyl alcohol, ethyl alcohol, n-butyl alcohol, isobutyl alcohol, acetone, methyl-ethyl-ketone, methyl-isobutyl-ketone, methyl acetate, ethyl acetate, butyl acetate; and neutralilzing the diluted acidic resin with an organic base selected from the group consisting of mono-ethanolamine, diethanolamine, triethanolamine, triethylamine, mono-propanolamine, dipropanolamine, NaOH, KOH, and $NH_4OH$.

17. A process according to claim 8, wherein the reaction between components (II) and (III) is effected in the presence of a homopolymerization-inhibiting compound selected from the group consisting of quinones and hydroquinones.

18. A process according to claim 8, wherein the reaction between the adduct and component (I) is catalyzed with a base selected from the group consisting of benzyldimethylamine, triethylamine, dimethylethanolamine, benzyltrimethylammonium hydroxide, KOH, NaOH, LiOH and $Na_2CO_3$.

* * * * *

PO-1050
(5/69)

201-41

UNITED STATES PATENT OFFICE
CERTIFICATE OF CORRECTION

Patent No. 3,856,725            Dated December 24, 1974

Inventor(s) Giorgio MONTESISSA and Francesco PIEPOLI

It is certified that error appears in the above-identified patent and that said Letters Patent are hereby corrected as shown below:

Title page, right column, second formula in the "Abstract":

$$\begin{array}{c} \text{"} \quad S - C - COOH \quad \text{"} \\ \phantom{xxx} \| \\ F - C - COOH \end{array} \quad \text{should read} \quad -- \begin{array}{c} S - C - COOH \\ \| \\ T - C - COOH \end{array} --.$$

After the "Abstract" and before the "Summary of the Invention": should read -- CROSS REFERENCE TO RELATED APPLICATIONS: NONE --.

Column 1, line 29: "anydride)" should read -- anhydride) --; lines 30-32:

$$\begin{array}{c} \text{"} \quad S - C - COOH \quad \text{"} \\ \phantom{xxx} \| \\ F - C - COOH \end{array} \quad \text{should read} \quad -- \begin{array}{c} S - C - COOH \\ \| \\ T - C - COOH \end{array} --.$$

Column 1, line 62: "60,β-unsaturated" should read -- α,β-unsaturated --.

Column 2, lines 3-4:

$$\begin{array}{c} \text{"} \quad S - C - COOH \quad \text{"} \\ \phantom{xxx} \| \\ F - C - COOH \end{array} \quad \text{should read} \quad -- \begin{array}{c} S - C - COOH \\ \| \\ T - C - COOH \end{array} --.$$

UNITED STATES PATENT OFFICE
CERTIFICATE OF CORRECTION

Patent No. 3,856,725   Dated December 24, 1974

Inventor(s) Giorgio MONTESISSA and Francesco PIEPOLI

It is certified that error appears in the above-identified patent and that said Letters Patent are hereby corrected as shown below:

Column 2, line 65: "reins" should read -- resins --; line 67: "emulsfied" should read -- emulsified --.

Column 3, lines 69-70: "present n the" should read -- present in the --.

Column 4, line 18: "proceeed" should read -- proceed --; line 30: "possiblity" should read -- possibility --.

Column 5, line 3: "acity" should read -- acidity --; line 61: "enchance" should read -- enhance --.

Column 6, line 55: "since" should read -- Since --.

Column 7, line 18: "when" should read -- When --; line 20: "$\alpha,60\beta$-unsaturated" should read -- $\alpha,\beta$-unsaturated --; line 31: "the interrupted is interruptd" should read -- the reaction is interrupted --; line 65: "comound" should read -- compound --.

Column 8, line 2: "benzylrimethylammonium" should read -- benzyltrimethylammonium --.

Column 9, lines 13-16:

UNITED STATES PATENT OFFICE
CERTIFICATE OF CORRECTION

Patent No. 3,856,725  Dated December 24, 1974

Inventor(s) Giorgio MONTESISSA and Francesco PIEPOLI

It is certified that error appears in the above-identified patent and that said Letters Patent are hereby corrected as shown below:

" 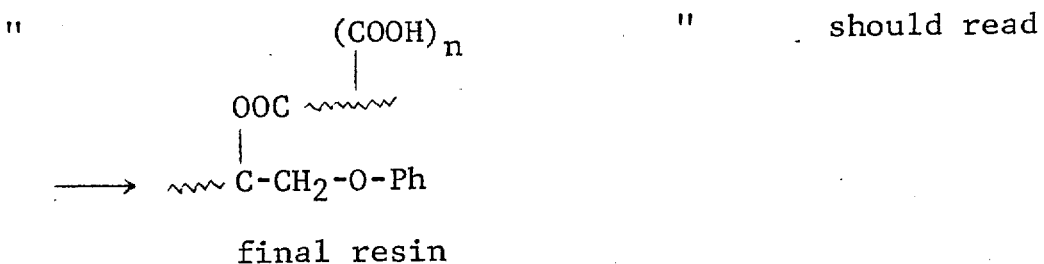 " should read

-- 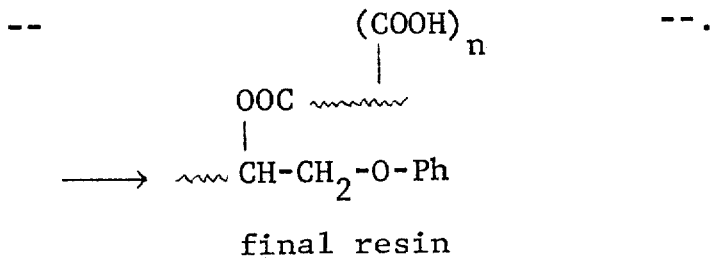 --.

Column 9, lines 55-56: "dehydratedd" should read -- dehydrated --; lines 56-57: "Victor wolf Ltd." should read -- Victor Wolf Ltd. --; line 67: "the" (first occurrence) should read -- The --.

Column 10, line 57: "watersoluble" should read -- water-soluble --.

Column 11, line 33: "nubmer" should read -- number --; line 69: "Epon 1011"(Shell)." should read -- Epon 1001 (Shell). --.

UNITED STATES PATENT OFFICE
CERTIFICATE OF CORRECTION

Patent No. 3,856,725　　　　　Dated　December 24, 1974

Inventor(s) Giorgio MONTESISSA and Francesco PIEPOLI

It is certified that error appears in the above-identified patent and that said Letters Patent are hereby corrected as shown below:

Column 14, line 7: "bakingn" should read -- baking --.

Column 15, line 31: "compoudn" should read -- compound --; line 64: "Z and $z_2$," should read -- Z and $Z_2$, --.

Column 17, line 2: "into a paint" should read -- into paint --; line 6: "dionized" should read -- deionized --; line 25: "then" should read -- than --; line 53: "OR, is which" should read -- OR, in which --; lines 62-64:

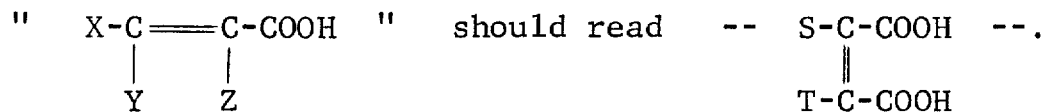

Column 18, line 15: "either" should read -- ether --; line 43: "butycellosolve," should read -- butylcellosolve, --; line 49: "organic and inorganic" should read -- organic or inorganic --.

Column 19, line 4: "butycellosolve" should read -- butylcellosolve --; line 5: "either" should read -- ether --; line 9: "neutralilzing" should read -- neutralizing --.

Signed and Sealed this sixteenth Day of March 1976

[SEAL]

Attest:

RUTH C. MASON
Attesting Officer

C. MARSHALL DANN
Commissioner of Patents and Trademarks